United States Patent
Adham et al.

(10) Patent No.: US 11,710,112 B2
(45) Date of Patent: *Jul. 25, 2023

(54) BLOCKCHAIN-BASED TRANSACTION KIOSK

(71) Applicant: BITACCESS INC., Ottawa (CA)

(72) Inventors: Mohammed Adham, Ottawa (CA); Nathaniel Wood, Ottawa (CA)

(73) Assignee: BITACCESS INC., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/497,375

(22) Filed: Oct. 8, 2021

(65) Prior Publication Data
US 2022/0188787 A1 Jun. 16, 2022

Related U.S. Application Data

(63) Continuation of application No. 17/120,046, filed on Dec. 11, 2020, now Pat. No. 11,157,887.

(51) Int. Cl.
*G06Q 20/18* (2012.01)
*G06F 9/54* (2006.01)
*G06Q 20/40* (2012.01)
*G06Q 20/38* (2012.01)
*G06Q 20/20* (2012.01)

(52) U.S. Cl.
CPC ............ *G06Q 20/18* (2013.01); *G06F 9/547* (2013.01); *G06Q 20/206* (2013.01); *G06Q 20/381* (2013.01); *G06Q 20/4014* (2013.01)

(58) Field of Classification Search
CPC .... G06Q 20/18; G06Q 20/206; G06Q 20/381; G06Q 20/4014; G06Q 20/38215; G06Q 20/401; G06Q 20/02; G06Q 2220/00; G06F 9/547
USPC .......................................................... 705/17
See application file for complete search history.

(56) References Cited

U.S. PATENT DOCUMENTS

| | | | | |
|---|---|---|---|---|
| 2018/0165655 A1* | 6/2018 | Marcelle | ............ | G06Q 10/1095 |
| 2019/0306137 A1* | 10/2019 | Isaacson | ............ | G06Q 30/0635 |
| 2019/0356641 A1* | 11/2019 | Isaacson | .............. | G06Q 20/384 |
| 2020/0118127 A1* | 4/2020 | Miller | .................. | G06Q 20/389 |
| 2020/0372533 A1* | 11/2020 | Rammal | ............ | G06Q 30/0238 |

* cited by examiner

*Primary Examiner* — Garcia Ade
(74) *Attorney, Agent, or Firm* — Perry + Currier Inc.

(57) ABSTRACT

The systems and methods described herein provide for facilitating in-person payments at a transaction kiosk. First, the system provides an authentication interface for display at a network-enabled transaction kiosk. A user is authenticated at the kiosk via the authentication interface, and based on that authentication, the system detects a payment application and a payment request corresponding to the user, wherein the payment application is associated with a service provider and the payment request was created with the payment application. Next, the system identifies a user interface scheme associated with the payment application, and then updates the user interface for display at the transaction kiosk to match the user interface scheme, then initiates a blockchain payment based on the payment request.

20 Claims, 9 Drawing Sheets

1. Find BTM     2. Identity     3. Amount     4. Send

START ORDER

PHONE NUMBER
+18588773420     Change

MACHINE
Nicks's phone repairs     Change
43 Cedar St. S, Timmins, ON, Canada ⓘ You will need to personally visit this location to complete the transaction

ASSET
[ C USDC ▼ ]
powered by Faa st.

PRICE
1 USDC - $ 1.20 CAD

SELL LIMIT
$1,000.00 CAD

[ START ]

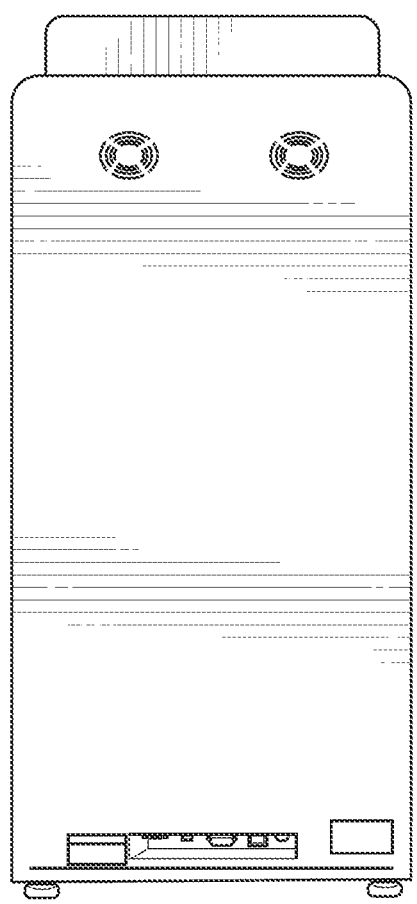
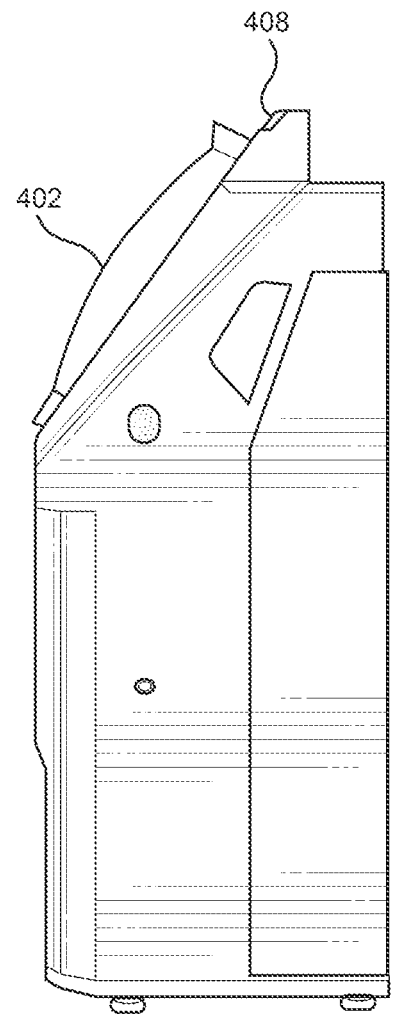
FIG. 4C
FIG. 4D

BLOCKCHAIN-BASED TRANSACTION KIOSK

FIELD OF THE INVENTION

The present invention relates generally to financial transactions, and more particularly, to systems and methods for providing a transaction kiosk for automated blockchain-based financial transactions.

BACKGROUND

Bitcoin Teller Machines ("BTMs") have been rising in popularity in recent years. A BTM is a kiosk that is located somewhere physical in the world, and which contains at least a screen interface, a network-enabled computer, and a cash device. Currently, BTMs function only to enable a user of the BTM to purchase an amount in a cryptocurrency, e.g., Bitcoin, Ethereum, or any other cryptocurrency. In this instance, a typical interaction may involve the user showing up physically to the BTM, scanning a QR code or other identifier containing a blockchain address for cryptocurrency, and selecting an option to deliver money to the blockchain address. The value amount is then exchanged into an equivalent amount in cryptocurrency. In order to fulfill this task, a BTM is required to perform tasks relating to Know Your Customer ("KYC") compliance, remote management, updates, and more.

While BTMs provide instantly settled transactions, they are limited only to the use case of a user purchasing a value of cryptocurrency with fiat currency. BTMs cannot perform any arbitrary payment, such as a request to pay money to another user in a cryptocurrency to be converted to fiat currency. The reason BTMs cannot perform such transactions is because for classical payment systems such as fiat currency, settlement is quite convoluted, often requiring several people in a chain in order for a single transaction to be completed. Such people in the chain will have to be cross-correlated to the payment, which is challenging to implement.

In addition, currently with BTMs, if a service provider, i.e., a provider of a product or service, wanted to accept in-person card, fiat currency, or cryptocurrency payments from a customer while employing a branded experience unique to that service provider, the service provider would generally be forced to deploy its own physical transaction kiosk to enable it to happen. Further, the service provider would need to have independent payment or settlement relationships with the kiosk provider, i.e., the entity that deployed the kiosk on behalf of the service provider.

Thus, there is a need in the field of financial transactions to create new and useful systems and methods for providing sophisticated blockchain-based transactions via an in-person transaction kiosk. The source of the problem, as discovered by the inventors, is a lack of transaction kiosks enabling in-person money, card, or crypto payments for an arbitrary product or service, while automatically managing the settlement of those payments. There is also a lack of transaction kiosks which allow for any service provider to potentially brand the kiosk as its own experience, with its own user interface.

SUMMARY

The invention overcomes the existing problems by providing a transaction kiosk, or BTM, which enables in-person cash, card, or crypto payments for an arbitrary product or service, while managing the settlement of the payments automatically. First, the system provides an authentication interface for display at a network-enabled transaction kiosk. A user is authenticated at the kiosk via the authentication interface, and based on that authentication, the system detects a payment application and a payment request corresponding to the user, wherein the payment application is associated with a service provider and the payment request was created with the payment application. Next, the system identifies a user interface scheme associated with the payment application, and then updates the user interface for display at the transaction kiosk to match the user interface scheme, then initiates a blockchain payment based on the payment request.

According to some embodiments, the payment request is a request to pay the user in fiat currency converted from the blockchain payment. The blockchain payment is from the second user. In some embodiments the system converts the blockchain payment from a value in cryptocurrency into an equivalent value in fiat currency. The system then dispenses the equivalent value in fiat currency (i.e., cash) to the user via the transaction kiosk.

According to some embodiments, the payment request is a request by the user to pay a value in cryptocurrency to a second user. The blockchain payment is from the user to be received by the second user in an equivalent value in fiat currency.

According to some embodiments, the transaction kiosk is connected via a network to a cloud application. The cloud application provides an API for enabling payment applications to generate payment requests.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein:

FIG. 4C is a figure illustrating an example of a back view of a transaction kiosk, in accordance with some embodiments.

FIG. 4D is a figure illustrating an example of a rightside view of a transaction kiosk, in accordance with some embodiments.

DETAILED DESCRIPTION

Figure 1A:
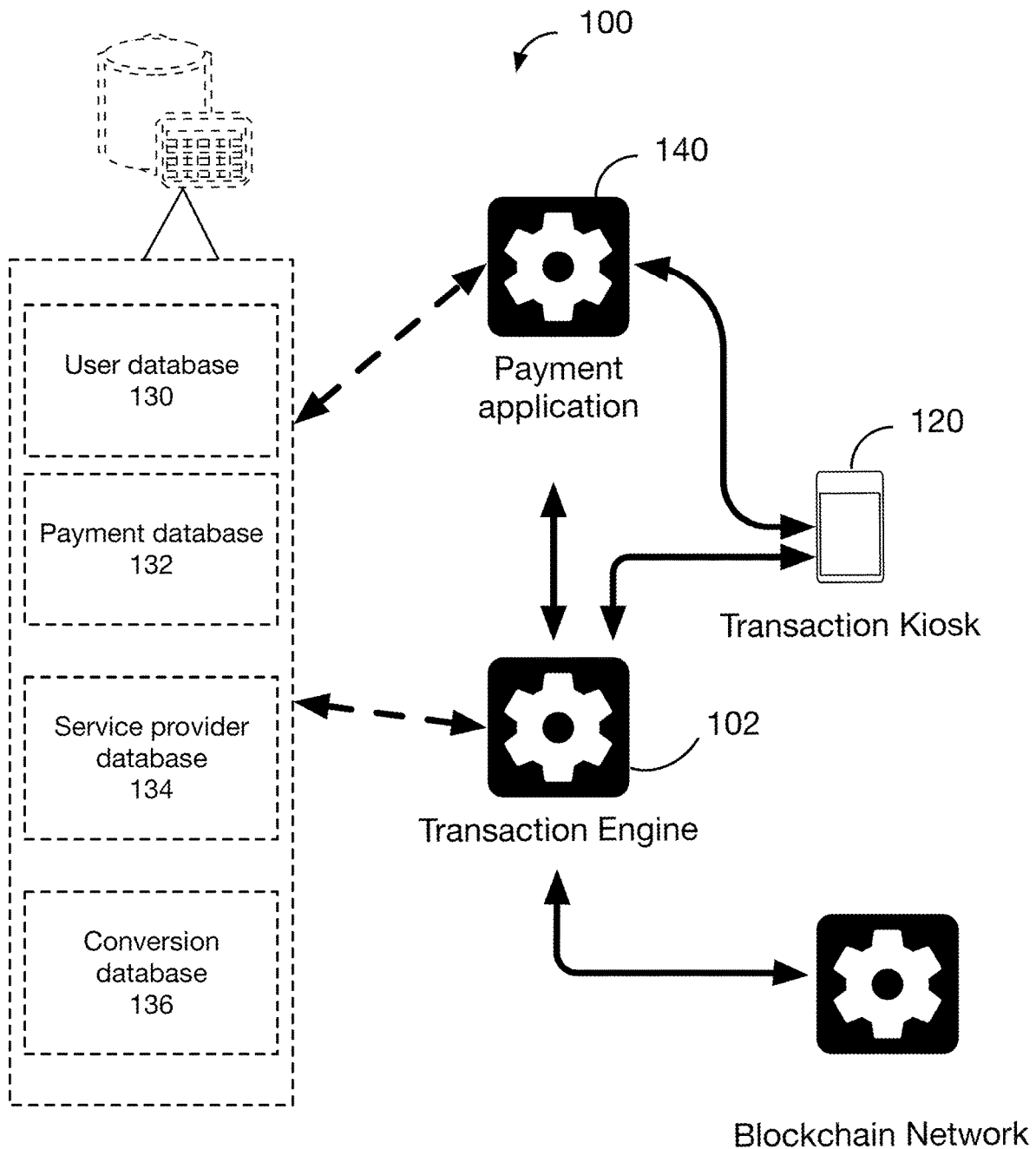
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

I. Exemplary Environments

FIG. 1A is a diagram illustrating an exemplary environment in which some embodiments may operate. In the exemplary environment 100, a transaction kiosk 120 is connected to a transaction engine 102. The transaction engine 102 is connected to a blockchain network 140 for the purposes of initiating blockchain-based payments in the blockchain network 140, and optionally connected to one or more database(s), including a user database 130, payment database 132, and/or service provider database 134. One or more of the databases may be combined or split into multiple databases. A payment application 140 is additionally connected to the transaction engine 102, transaction kiosk 120, and the database(s). The transaction engine and/or transaction kiosk in this environment may be computer devices or hosted on computer devices.

The exemplary environment 100 is illustrated with only one transaction kiosk, one blockchain network, one transaction engine, and one payment application for simplicity, though in practice there may be more or fewer instances of each. In some embodiments, one or more of these components may be part of or hosted on the same computer or device.

In one embodiment, the transaction engine 102 may perform the method 200 (FIG. 2A) or other method herein and, as a result, provide in-person payments at a transaction kiosk. In some embodiments, this may be accomplished via communication with the transaction kiosk(s), blockchain network(s), payment application(s), or other components of the system over a network. In some embodiments, the transaction engine 102 is an application hosted on a computer or similar device, or is itself a computer or similar device configured to host an application to perform some of the methods and embodiments herein. In some embodiments, the payment application 140 is an application hosted on a computer or similar device, or is itself a computer or similar device configured to host an application to perform some of the methods and embodiments herein.

Optional transaction kiosk(s) 120 (hereinafter "kiosks") are devices which physically exist in some public space to provide a user interface by which a user of the kiosk can perform payment-related transactions. The kiosk is configured to display information in a user interface and allow for entering, generating, sending, and receiving information. In some embodiments, the transaction kiosk 120 is network- and/or cloud-enabled, allowing for connection and transfer of information to and from network-based payment applications, cloud-based applications or storage, blockchain addresses and blockchain networks, and more. In some embodiments, one or more transaction kiosks 120 may be associated with a service provider, user(s), kiosk provider (i.e., an entity which owns and/or maintains the kiosk in the physical space), or other entities. In some embodiments, transaction kiosk 120 is a computing device capable of hosting and executing one or more applications or other programs capable of sending and/or receiving information. In some embodiments, the transaction kiosk 120 is a BTM or other Automated Teller Machine (ATM), or otherwise may be a computer desktop or laptop, mobile phone, or any other suitable device capable of sending and receiving information. In some embodiments, the transaction engine 102 may be hosted in whole or in part as an application executed on the transaction kiosk 120.

In some embodiments, the transaction kiosk 120 contains local application software, which consists of all business logic and user interface functions. In some embodiments, the vast majority of the kiosk functionality is contained in this local application software. This software can also be updated automatically and frequently, and changes are visible in real-time across the kiosk network.

Figure 4A:
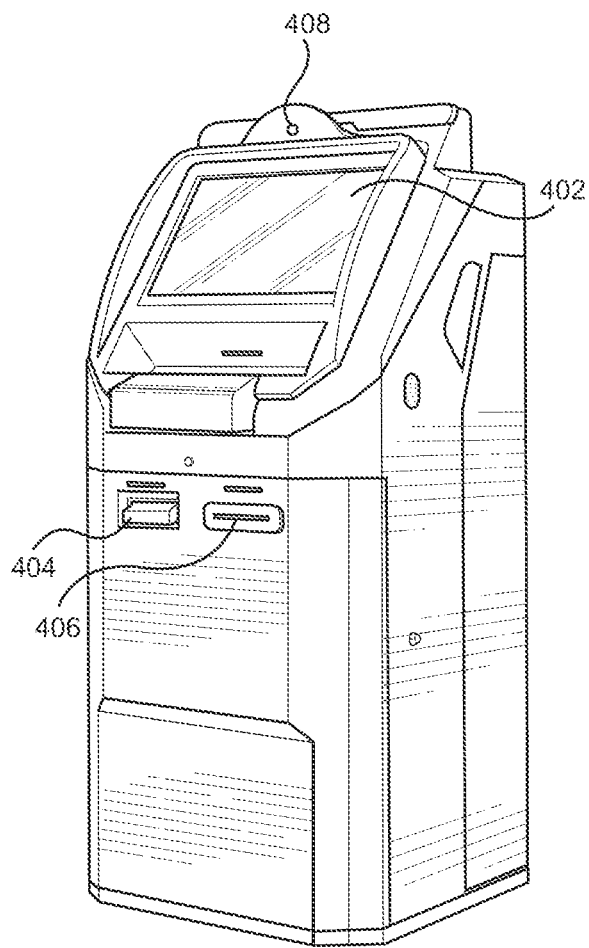
FIG. 4A is a figure illustrating an example of an angled front view of a transaction kiosk, in accordance with some embodiments.
Figure 4B:
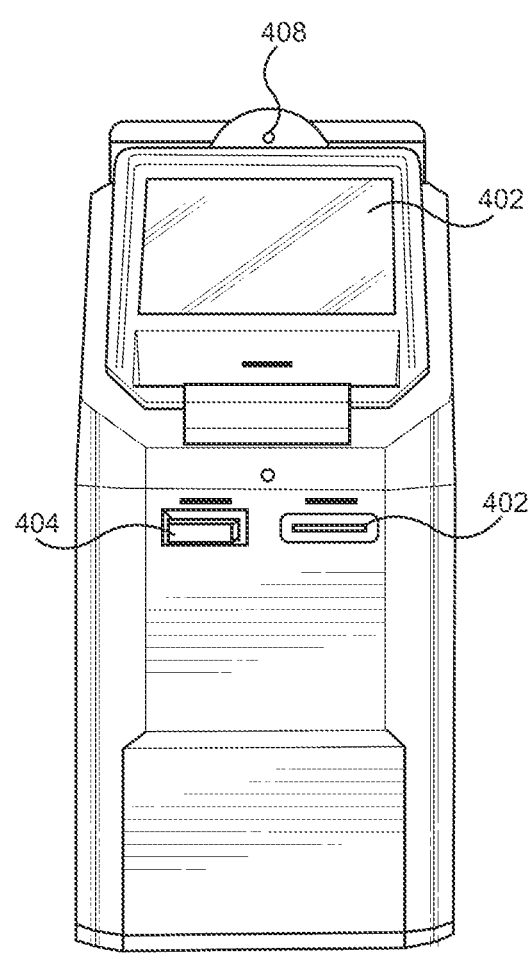
FIG. 4B is a figure illustrating an example of a front view of a transaction kiosk, in accordance with some embodiments.

FIGS. 4A-4D are figures illustrating one example of a transaction kiosk at various angles, in accordance with some embodiments. Features which are present in the illustrated transaction kiosk include a touchscreen display 402 providing for a user interface that a user can interact with; a dispensing area 404 for dispensing currency for a recipient to physically collect at the kiosk; a depositing area 406 for a user to deposit fiat currency; and a camera 408 for user identification, authentication, and security purposes. FIG. 4A is a figure illustrating an example of an angled front view of a transaction kiosk, in accordance with some embodiments. FIG. 4B is a figure illustrating an example of a front view of a transaction kiosk, in accordance with some embodiments. FIG. 4C is a figure illustrating an example of a back view of a transaction kiosk, in accordance with some embodiments. FIG. 4D is a figure illustrating an example of a rightside view of a transaction kiosk, in accordance with some embodiments.

Returning to FIG. 1A, optional database(s) 130 including one or more of a user database 130, payment database 132, service provider database 134, and conversion database 136 function to store and/or maintain, respectively, user information, payments and payment requests, service provider information, and cryptocurrency and fiat currency exchange data. The optional database(s) may also store and/or maintain any other suitable information for the transaction engine 102 to perform elements of the methods and systems herein. In some embodiments, the optional database(s) can be queried by one or more components of system 100 (e.g., by the transaction engine 102), and specific stored data in the database(s) can be retrieved. In some embodiments, some or all elements of database(s) 130 will reside on private servers.

Payment application 140 is a software application or other application configured to define how a service provider requests blockchain-based payments, provides a custom user interface for users of the kiosk, authenticates users, and more. In some embodiments, the payment application 140 utilizes an API associated with the transaction engine 102 to define its behavior with respect to the transaction kiosk 120 and the transaction engine 102. For example, a REST API may be utilized.

Blockchain network 142 is a distributed digital ledger of data that is shared among a network of independent parties. When a user or entity within the blockchain network wants to add a record, or "transaction", to a blockchain, users and entities in the blockchain with validation control verify the proposed transaction. In this fashion, blockchains are peer-to-peer systems wherein data integrity is maintained through a large distributed network. Components within a given blockchain include a block, or list of transactions recorded into a ledger over a given period; a chain, or hash that links one block to another; and a network composed of full nodes, with each node containing a complete record of all the transactions recorded within the blockchain. These transactions can record not only the details of any exchanged value but also any associated data payload linked to the transactions.

Figure 1B:
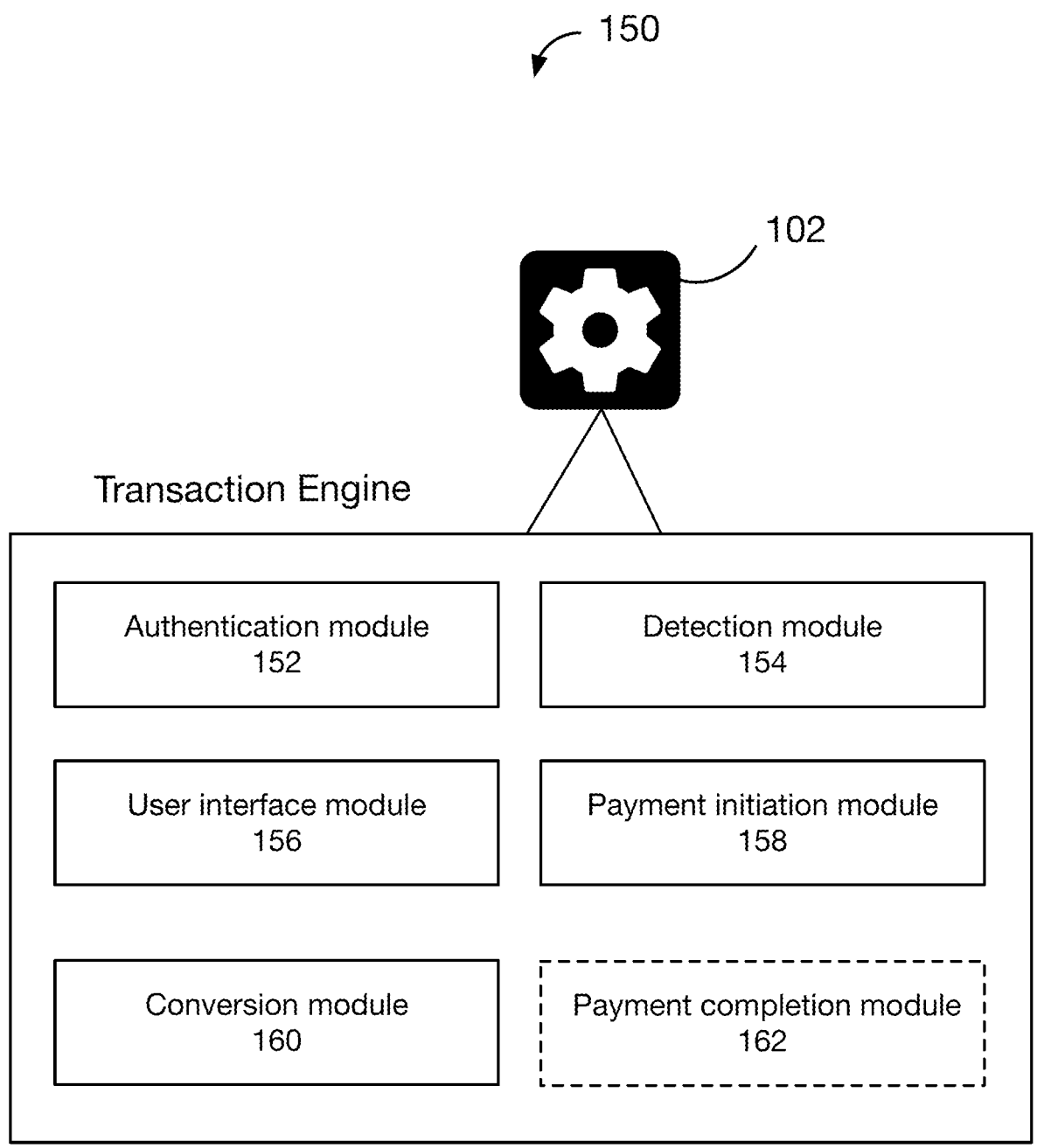
FIG. 1B is a diagram illustrating an exemplary computer system that may execute instructions to perform some of the methods herein.

FIG. 1B is a diagram illustrating an exemplary computer system 150 with software modules that may execute some of the functionality described herein.

Authentication module 156 functions to authenticate users with respect to the service provider, transaction engine, and/or transaction kiosk.

Detection module 154 functions to detect a payment application and a payment request corresponding to the user, wherein the payment application is associated with a service provider and the payment request was created with the payment application.

User interface module 156 functions to present a user interface to a user of the transaction kiosk, including authentication interfaces and custom interfaces defined by service providers.

Payment initiation module 158 functions to initiate blockchain payments based on payment requests.

Conversion module 160 functions to convert a cryptocurrency or fiat currency into a different cryptocurrency or fiat currency according to latest received exchange rates.

Payment completion module 162 functions to complete blockchain-based payments, record them within the blockchain network, and notify users that payments have been completed.

The above modules and their functions will be described in further detail in relation to an exemplary method below.

Various aspects of this exemplary embodiment will be described in further detail in relation to an exemplary method below.

II. Exemplary Method

Figure 2A:
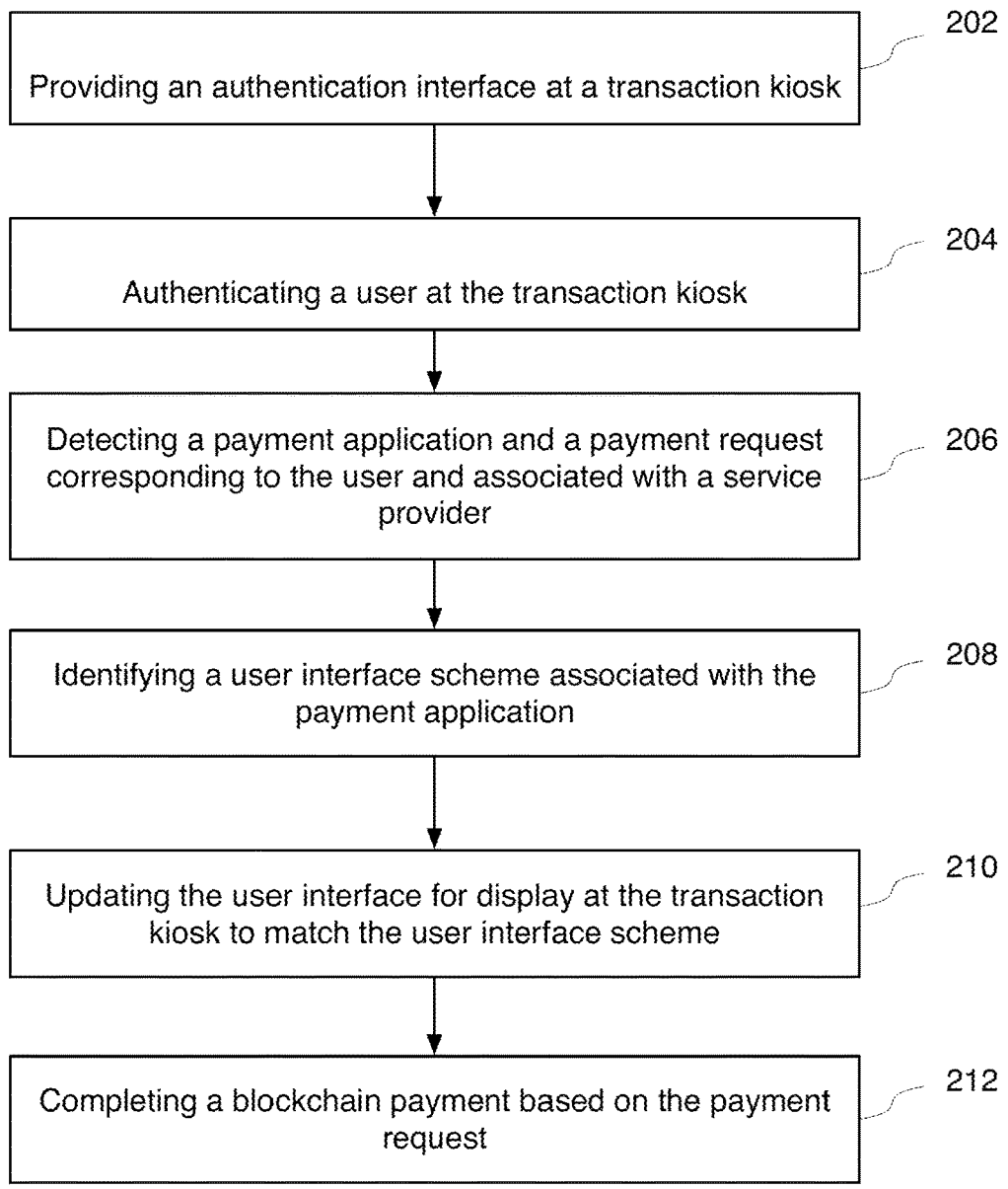
FIG. 2A is a flow chart illustrating an exemplary method that may be performed in some embodiments.

FIG. 2A is a flow chart illustrating an exemplary method that may be performed in some embodiments.

At step 202, the system provides an authentication interface at a transaction kiosk. In some embodiments, an authentication interface may be a user interface configured to request some information from a user in order for an authentication procedure to occur. In some embodiments, the user is requested by the authentication interface to enter a unique identifier, such as an RFID card, a phone number, credit card, or any other form of identifying the user within the system. In some embodiments, a user PIN or password may additionally or alternatively be requested.

At step 204, the system authenticates a user at the transaction kiosk. In some embodiments, authentication may involve Know Your Customer ("KYC"), Anti-Money Laundering ("AML"), or other compliance-related procedures. In some embodiments, authentication may involve secure sign-on or verification procedures. A user may be verified within the transaction engine, transaction kiosk, payment application associated with a service provider, or any other suitable component of the system.

At step 206, the system detects a payment application and a payment request corresponding to the user and associated with a service provider. A payment application is an application whereby service providers—or most likely the application and/or product developers representing the service providers—can define how they would like to enable payments within the transaction kiosk regarding their particular services or offerings. In some embodiments, the transaction engine may provide an interface for application or product developers to define customized user interface schemes, enable payments and customize how they are to be treated, and more. In some embodiments, the interfaces defined by the service providers can be defined via an API within the transaction engine or a separate cloud-based application. In some embodiments, a payment application can contain a user interface for users to request payments, check payment statuses and kiosk locations, and more.

In some embodiments, a payment request can be a request from a user or end customer. In some embodiments, a payment request may be a "pay out" request, whereby a successful end result is that cash is to be dispensed to the customer at the kiosk. In other embodiments, a payment request may be a "pay in" request, whereby the user requests to send a blockchain payment to another user or party. Such payments will be described further below.

In some embodiments, a service provider may be any provider of a service or product. For example, a provider may be Paypal, Square, or any other financial transactions company interested in kiosk-based transaction services for cryptocurrency and/or fiat currency.

At step 208, the system identifies a user interface scheme associated with the payment application. In some embodiments, the system updates the user interface based on the user of the kiosk being associated with (and authenticated within) the payment application. The system is configured to update the user interface to reflect the payment application's payment request detected for that user.

A service provider can define what the user interface of a kiosk should look like for that service provider's customers. In effect, this may allow a service provider to have an ATM or BTM network as large as one which a big bank may have. In addition, with traditional ATMs, the ATM cannot identify what a customer will be buying, whereas with a BTM or kiosk, the system can identify who requested the payment, where it's coming from, what product is to be purchased, and more. This can provide additional insights and options for service providers, and additional conveniences for users.

At step 210, the system updates the user interface for display at the transaction kiosk to match the user interface scheme. The user interface is update to the payment application's specifications, as defined via the interface API within the transaction engine. From the perspective of the user or end customer, they appear to be using a kiosk provided by the service provider associated with the payment application. For example, a Paypal or Square logo and branding may appear prominently, or particular distinctive colors or fonts associated with the company.

At step 212, the system initiates a blockchain payment based on the payment request. The system will request information about the payment request from the payment application. For example, the system may request who the user is, and/or whom the user is trying to request money from. They may also request a phone number of a party, for purposes of being able to cross-correlate a known customer to this particular payment. For example, the user may submit a phone number and an SMS message is sent to the user verifying that they are the recipient of the phone number. If the user has not been documented before, some KYC procedures may apply as described above.

Figure 3A:
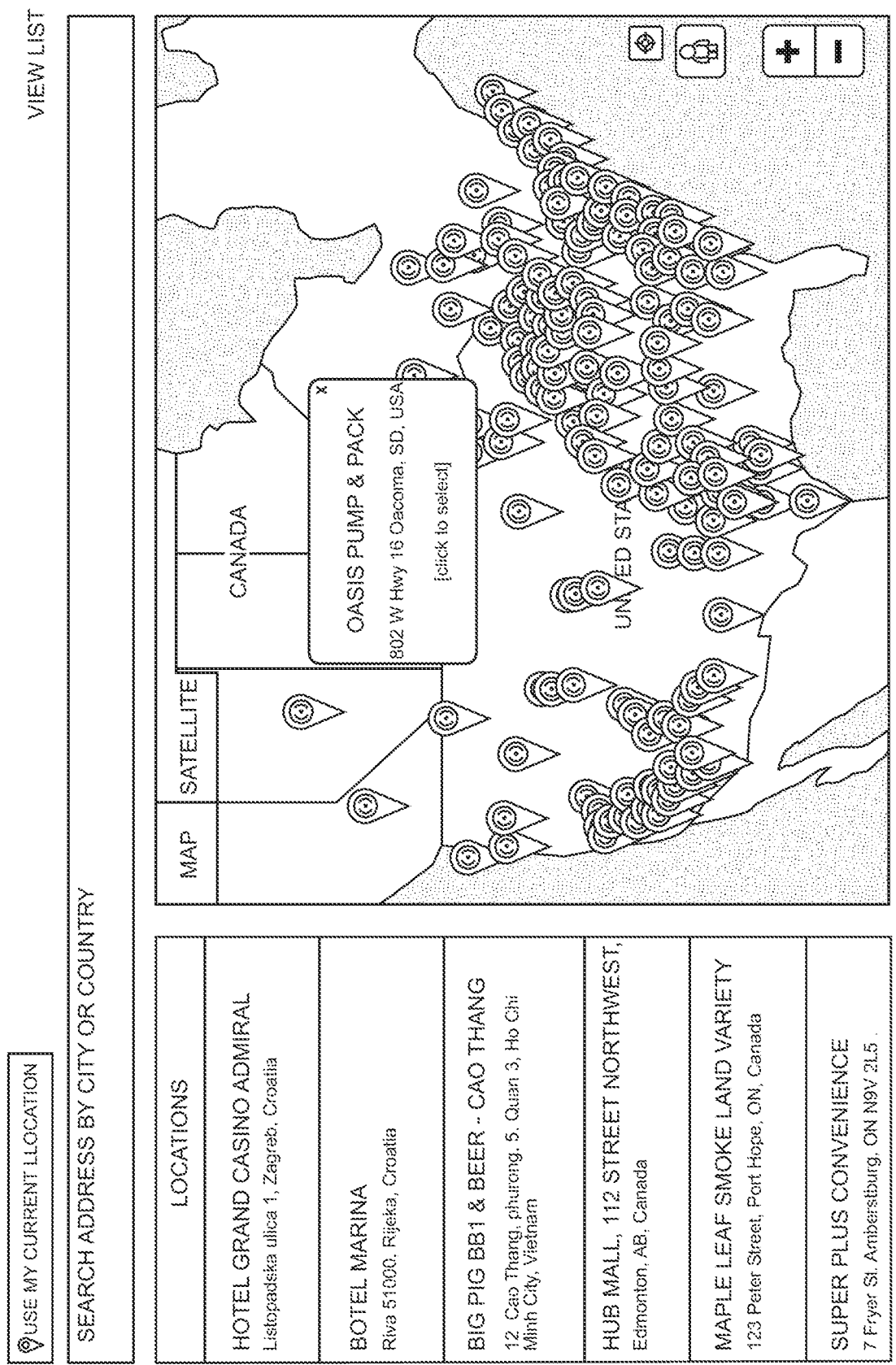
FIG. 3A is a figure illustrating an example of a user interface for a user to select a kiosk location before initiating a transaction, in accordance with some embodiments.

The API itself defines the payments possible. A user, or individual within a given store who has a wallet, may be interacting with the store, and it will be directed to an API. The individual can proceed at that point after identifying themselves. In some cases, a user may wish to "sell" to the kiosk. Selling means they wish to send cryptocurrency (e.g., Bitcoin), and at the end of the transaction they receive a set product or service. The user will have to select a location of a nearby kiosk, as they will have to go to a physical kiosk. The payment application may have a list of locations and statuses about whether they're available or not. An example of a list of locations and statuses within a payment application can be found in FIG. 3A.

Figure 3B:
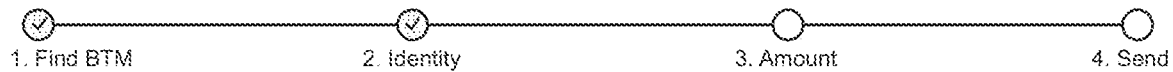
FIG. 3B is a figure illustrating an example of a user interface for a user to start an order to sell via the kiosk, in accordance with some embodiments.

Once the user has found their location, the user can proceed with a transaction. In some embodiments, the user needs to ensure via the payment application that there is enough cash in the machine, and that the limits that a kiosk provider (or "operator") has set for the individual are met. In some embodiments, operators are money service businesses ("MSBs"), and thus the limits set for the individual are based on regulations. In some embodiments, if a limit is not available, the user may need to provide some additional identification. To create a transaction, a user provides the API with information such as, e.g., which machine he would like to use, how much cash he wishes to receive, what kind of cryptocurrency he's going to send, or any other suitable details regarding the transaction. A transaction is then generated. An example of a user starting a sell order can be found in FIG. 3B. The payment app screen includes a sell limit, an asset used by the kiosk, and a conversion price between that asset and a fiat currency (CAD).

At this point, no actual money has exchanged hands. Someone, i.e., user, will be inserting cash into the ATM. Once they insert it, the transaction engine already has identified the destination address to send the cryptocurrency to. If the kiosk will be dispensing cash, however, the transaction engine has to be configured to dispense before the cash appears. The payment application sends a payment request through the API, and the transaction engine responds by instructing the payment application to debit the payor and deliver cryptocurrency to the recipient's address. The recipient is then notified that they can collect the cash at the kiosk.

In some embodiments, the steps for dispensing cash (i.e., fiat currency) can be configured as follows. If the kiosk has sufficient funds to dispense cash for the transaction, and the user goes to the physical kiosk to interact with it, then one scenario is that the user, upon arriving at the kiosk, must enter their phone number. In return, they will receive a code. The payment application and/or transaction engine has now received some information about who the user is within the system. A payment request immediately surfaces upon this identification. For example, a button labeled "Complete your PayPal transaction" may appear on the screen as part of the branded user interface. Upon clicking on the button, the PayPal user interface is displayed. The user is then told that they can collect their $500, and the cash is dispensed. In some embodiments, a user may opt to have the cash be transferred directly to the user's bank account, or into a cryptocurrency wallet or some other electronic wallet.

In some embodiments, the steps for loading cash into the kiosk can be configured as follows. Cash can be loaded up to a particular amount. Because it's a "cash in" rather than "pay out" scenario, exact change isn't always possible or preferred, or otherwise the user may have an outstanding balance. In some embodiments, the payment application has some logical operations to handle underpayments if they do occur.

In some embodiments, a list of available currencies may then appear (e.g., USD, pounds, or any other suitable currencies). A webhook then notifies the payment application is complete. In some embodiments, the user is notified that the payment has been completed. The notification can occur on the payment application, at the kiosk, or any other suitable location.

In some embodiments, instant settlement at the kiosk may allow for the ability to pay affiliate fees in the event of referrals. For example, if a first person referred a second person to the payment application, then when the second person creates the transaction at the kiosk, an instant settlement of a reward to the first person can be processed.

In some cases of conversion from one currency to another there may be a fluctuation in exchange prices. In some embodiments, a timer can be implemented. For example, to sell a given cryptocurrency and dispense cash, you may have to send within five minutes in order to send $500. If you send after the timer is up, then if the price is in favor of your transaction, it will be honored, whereas if the price is lower, the transaction will be refunded automatically.

In some embodiments, a refund mechanism can be implemented, such as, e.g., in the above example, or in case of machine malfunction. If the machine is short the necessary amount, then it will trigger the refund of the exact same amount of cryptocurrency in order to make the user whole again.

In some embodiments, a user may only be able to settle with a single currency. For example, if a kiosk provider only works with one currency, such as Bitcoin, then if a user sends $500 in Ethereum to the kiosk, then this Ethereum value also gets transferred to Bitcoin for the kiosk provider. Next, the Bitcoin needs to be transferred to Ethereum, which may lead to fluctuations, affiliate payments, or other complexities. In some embodiments, in the case of a refund, the Ethereum must be transferred back to Bitcoin.

In some embodiments, operators are MSBs, so regulations require them to identify their customers via KYC processes. For example, within the United States, for transactions over $1,000, an MSB must identify the customer. If the service provider has identified the customer but the kiosk provider has not, then the system may be configured to provide identification of the customer for the kiosk provider. For example, the user interface may prompt the user to enter information to identify themselves. The user is notified that they can collect their cash, but only after they submit identification within 48 hours. If they pass the KYC identification process, they can collect the cash. If they don't, the money is returned to the payment application and is reversed.

Figure 2B:
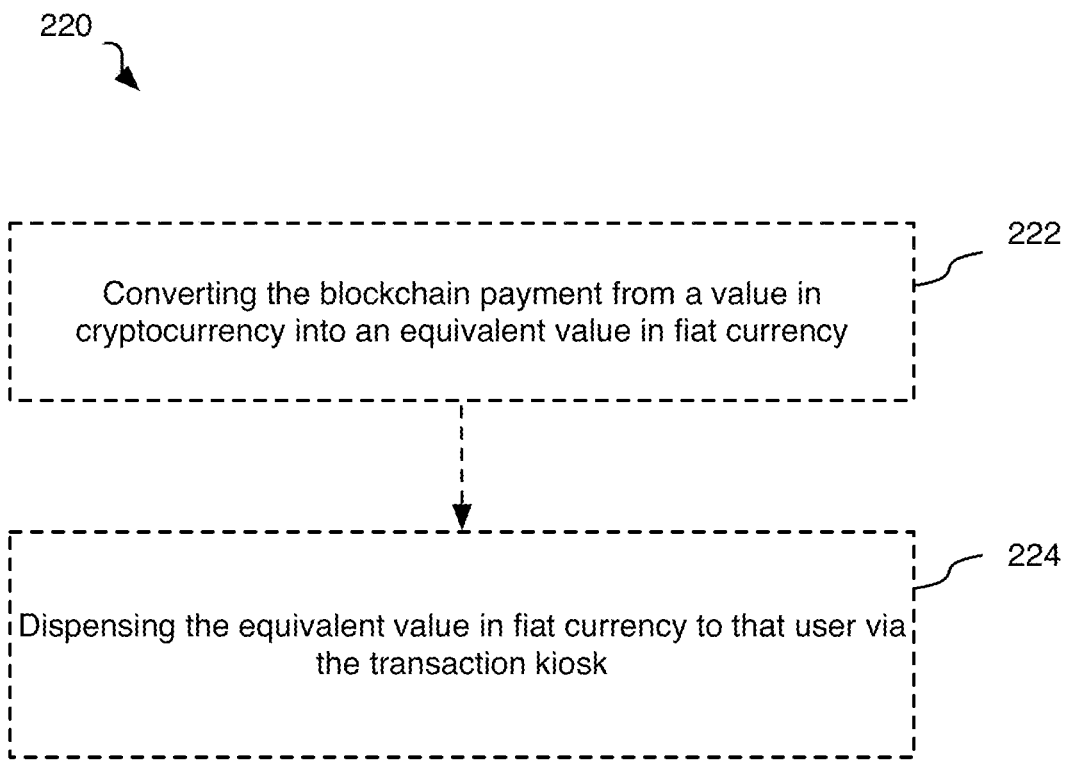
FIG. 2B is a flow chart illustrating additional steps that may be performed in accordance with some embodiments.

FIG. 2B is a flow chart illustrating additional steps that may be performed in accordance with some embodiments.

At optional step 222, the system converts the blockchain payment from a value in cryptocurrency into an equivalent value in fiat currency. At optional step 224, the system then dispenses the equivalent value in fiat currency to that user via the transaction kiosk.

Figure 5:
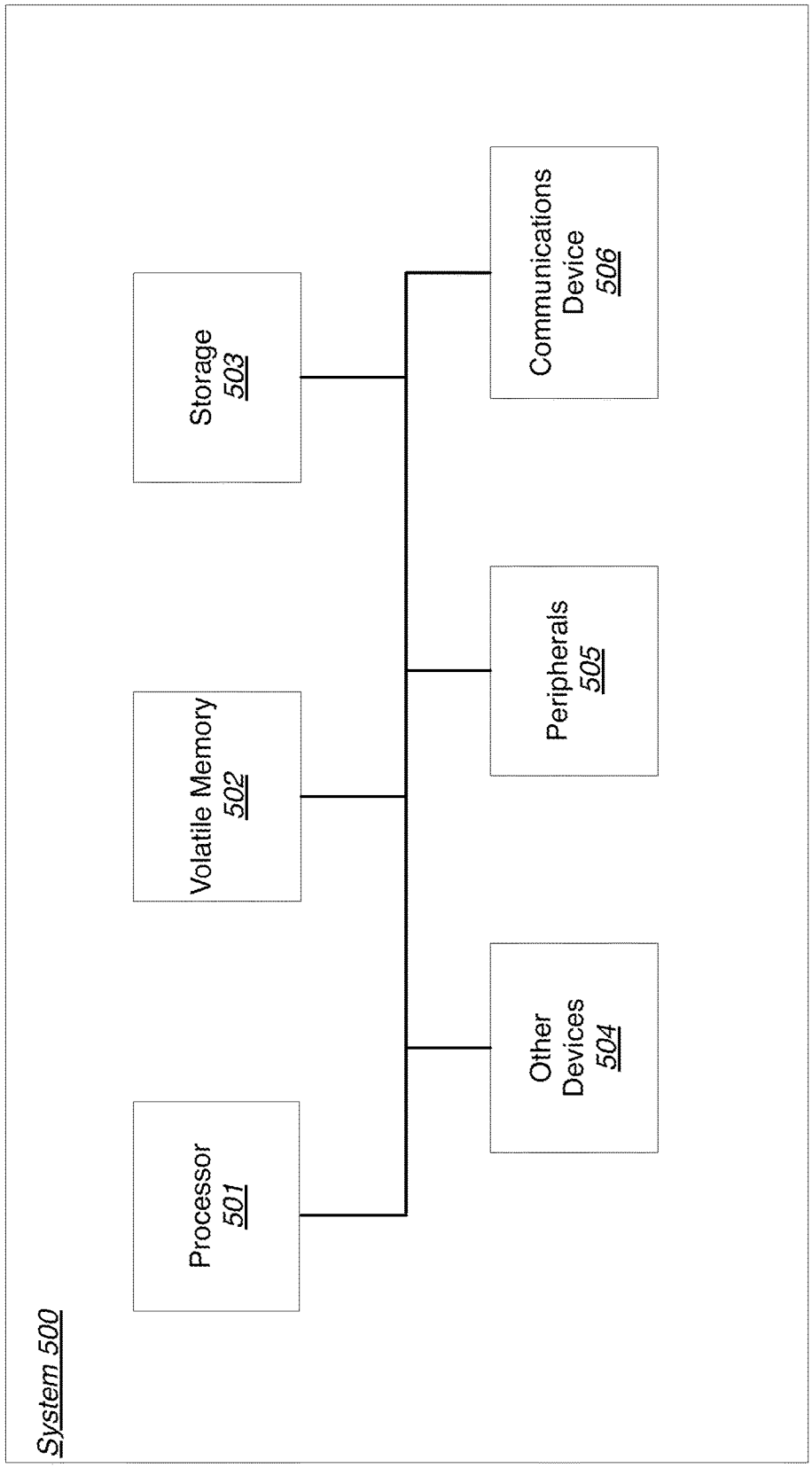
FIG. 5 is a diagram illustrating an exemplary computer that may perform processing in some embodiments.

FIG. 5 is a diagram illustrating an exemplary computer that may perform processing in some embodiments. Exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. RAM is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as, e.g., hard drives, solid state drives, or flash drives. Communications device 506 may connect the computer 100 to an external medium. For example, communications device 506 may take the form of a network adapter that provides communications to a network. A computer 500 may also include a variety of other devices 504. The various components of the computer 500 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method for providing in-person payments at a transaction kiosk, comprising:
    providing, for display at a network-enabled transaction kiosk, an authentication interface;
    authenticating a user at the transaction kiosk via the authentication interface;
    based on the authentication of the user, detecting a payment application and a payment request corresponding to the user, wherein the payment application is associated with a service provider and the payment request was created with the payment application;
    identifying a user interface scheme associated with the payment application;

updating the user interface for display at the transaction kiosk to match the user interface scheme; and completing a blockchain payment based on the payment request.

2. The method of claim 1, wherein authenticating the user at the transaction kiosk comprises:

receiving, via the user interface, a unique identifier associated with the user; and detecting that the user has an existing connection to the payment application associated with the service provider.

3. The method of claim 1, wherein the payment request comprises a request to pay the user in fiat currency converted from the blockchain payment, and wherein the blockchain payment is from a second user.

4. The method of claim 3, further comprising:

converting the blockchain payment from a value in cryptocurrency into an equivalent value in fiat currency; and dispensing the equivalent value in fiat currency to the user via the transaction kiosk.

5. The method of claim 1, wherein the payment request is a request by the user to pay a value in cryptocurrency to a second user, and wherein the blockchain payment is from the user to be received by the second user in an equivalent value in fiat currency.

6. The method of claim 1, wherein the transaction kiosk is connected via a network to a cloud application, and wherein the cloud application provides an Application Programming Interface (API) for enabling payment applications to generate payment requests.

7. The method of claim 1, wherein the transaction kiosk is one of a plurality of transaction kiosks within a connected kiosk network associated with the service provider.

8. The method of claim 1, wherein the transaction kiosk is a Bitcoin Teller Machine (BTM).

9. The method of claim 1, wherein the user interface scheme is defined via an Application Programming Interface (API).

10. The method of claim 1, further comprising:

facilitating, based on the payment request, an automatic conversion from a fiat currency to a cryptocurrency.

11. The method of claim 1, wherein the user interface scheme is configured by the service provider, via the payment application, to present a custom user interface associated with the service provider.

12. The method of claim 1, wherein the user interface scheme is configured to display one or more pieces of branding associated with the service provider.

13. The method of claim 1, wherein the kiosk is maintained by a kiosk provider, and wherein the kiosk provider is different from the service provider.

14. The method of claim 13, wherein authenticating the user comprises a Know Your Customer (KYC) data transfer between the kiosk operator and the service provider.

15. The method of claim 1, further comprising:

generating a blockchain-based cryptocurrency transaction based on the payment request.

16. The method of claim 1, further comprising:

notifying the user, via the user interface scheme, that a blockchain payment has been completed.

17. The method of claim 1, further comprising:

Settling, based on the request for payment, one or more affiliate fees associated with a referral to the payment application.

18. A non-transitory computer-readable medium containing instructions for providing in-person payments at a transaction kiosk, comprising:

instructions for providing, for display at a network-enabled transaction kiosk, an authentication interface;

instructions for authenticating a user at the transaction kiosk via the authentication interface;

based on the authentication of the user, instructions for detecting a payment application and a payment request corresponding to the user, wherein the payment application is associated with a service provider and the payment request was created with the payment application;

instructions for identifying a user interface scheme associated with the payment application;

instructions for updating the user interface for display at the transaction kiosk to match the user interface scheme; and instructions for completing a blockchain payment based on the payment request.

19. The non-transitory computer-readable medium of claim 18, wherein the payment request comprises a request to pay the user in fiat currency converted from the blockchain payment, and wherein the blockchain payment is from a second user.

20. The non-transitory computer-readable medium of claim 18, wherein the payment request is a request by the user to pay a value in cryptocurrency to a second user, and wherein the blockchain payment is from the user to be received by the second user in an equivalent value in fiat currency.

* * * * *